Sept. 15, 1953　　　A. J. BRADFORD　　　2,651,966
CONTINUOUS LOOP FILM PROJECTION APPARATUS
Filed July 29, 1949　　　　　　　　　　　　4 Sheets-Sheet 1

Inventor
Arthur J. Bradford
By Eli Mullin
Attorney

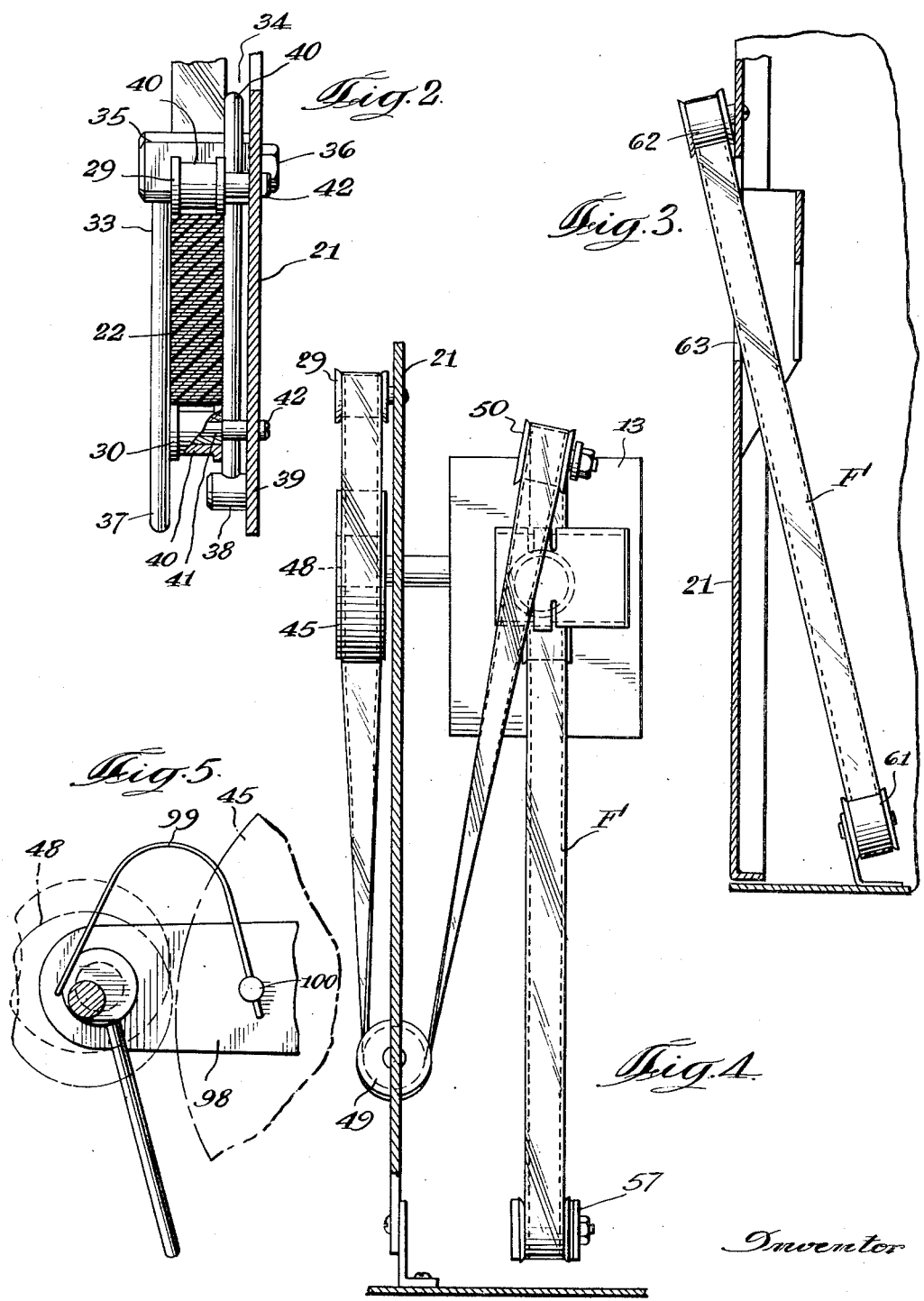

Sept. 15, 1953    A. J. BRADFORD    2,651,966
CONTINUOUS LOOP FILM PROJECTION APPARATUS
Filed July 29, 1949    4 Sheets-Sheet 3
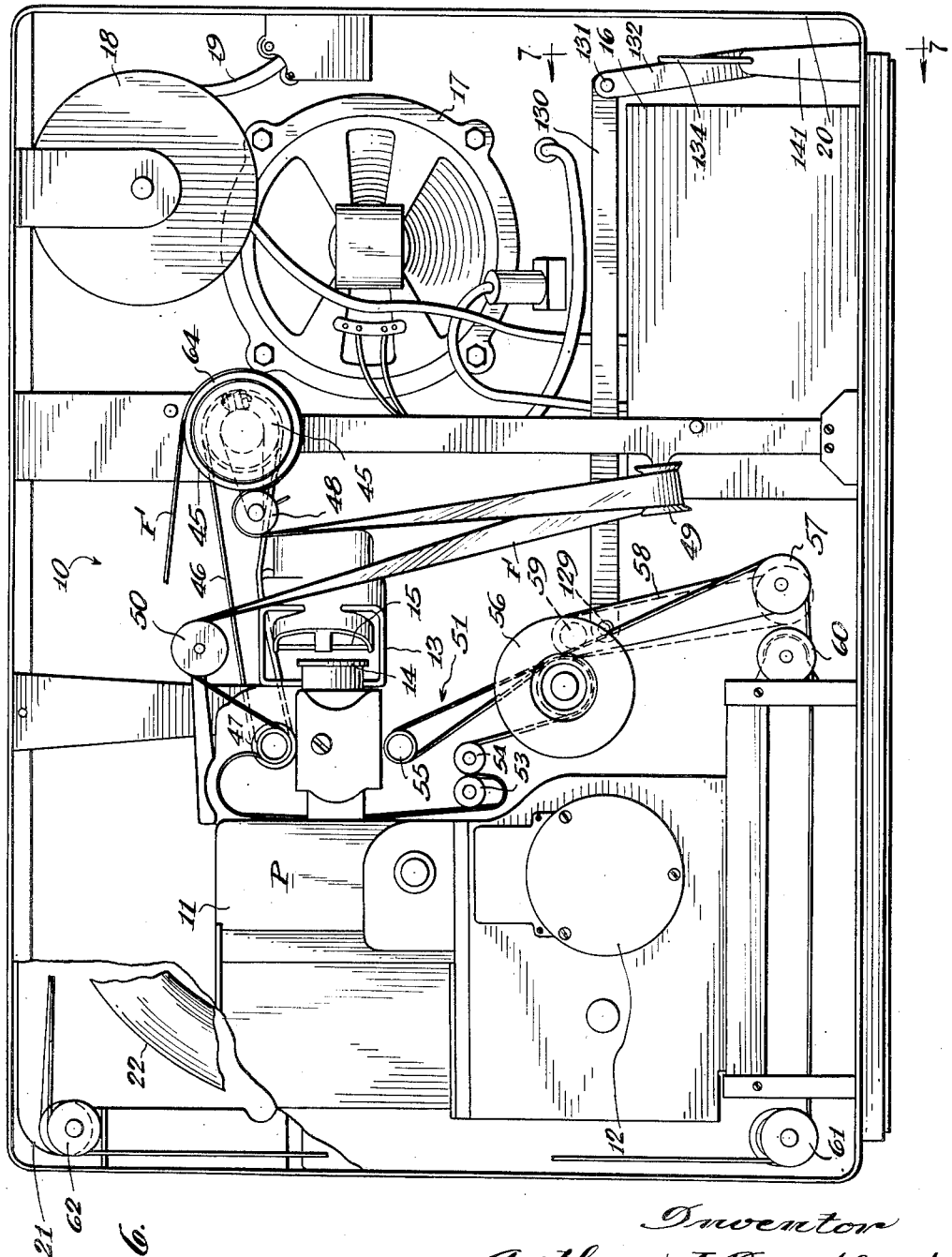
Inventor
Arthur J. Bradford
By Eli Mullin
Attorney

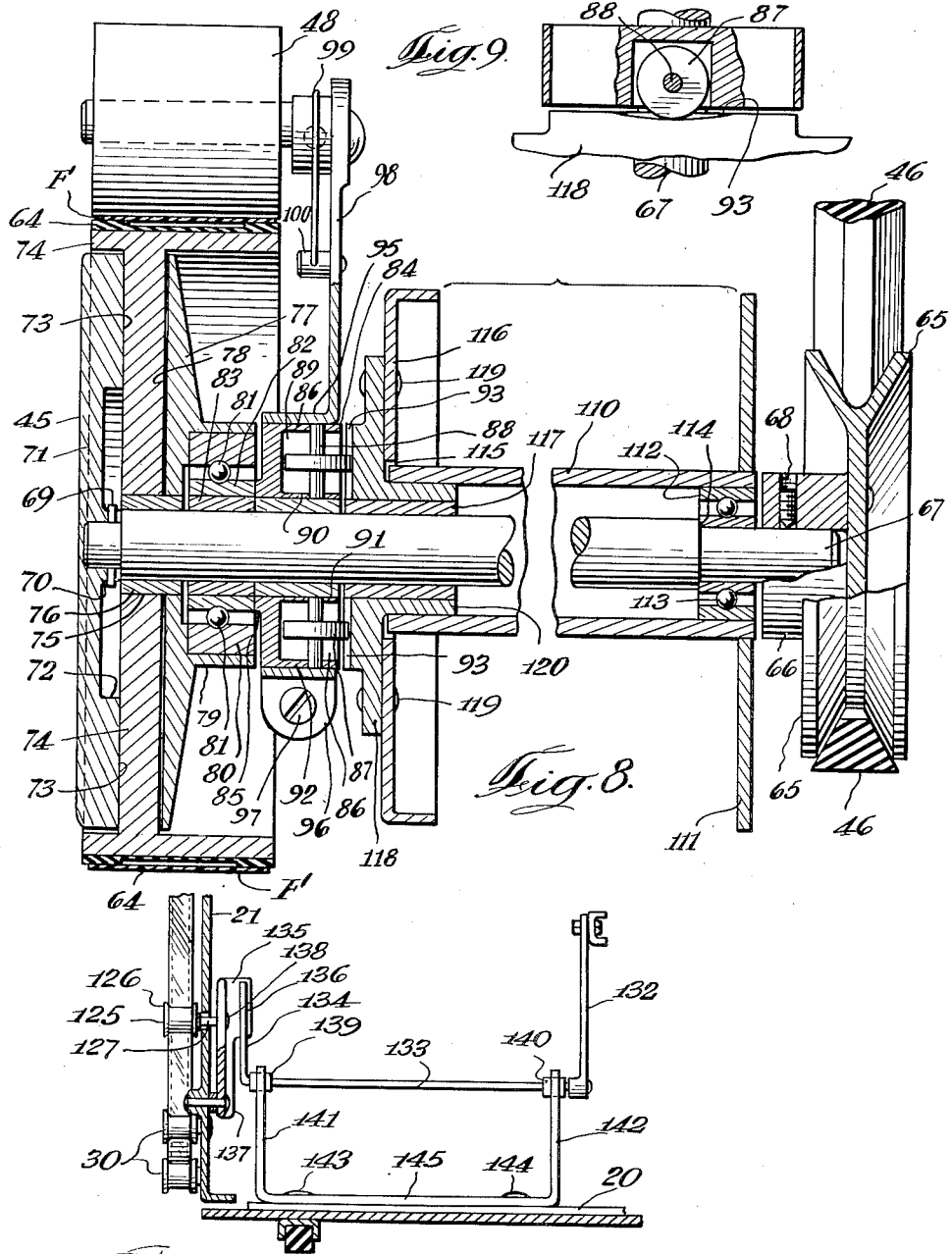

Patented Sept. 15, 1953

2,651,966

UNITED STATES PATENT OFFICE 2,651,966

CONTINUOUS LOOP FILM PROJECTION APPARATUS

Arthur J. Bradford, Chicago, Ill.

Application July 29, 1949, Serial No. 107,436

16 Claims. (Cl. 88—18.7)

This invention relates to motion picture projection apparatus, particularly of the type characterized by an endless loop of film mounted in a magazine for continuously feeding film to the projector from one periphery of the magazine, and after exhibition continuously rewinding the film upon the other periphery. Specifically this invention is directed to improvements in the unwinding, rewinding and storage means for the purpose of enabling the projector to utilize a greatly increased length of film without increasing the inter-layer friction and resultant abrasive damage to the surface of the film within the system.

Heretofore portable projectors of the type described above have been limited in their application by virtue of their inability to accommodate long film lengths in their magazines or cartridges without subjecting the films to undue abrasive wear. Attempts to increase the film lengths have invariably terminated in failure, because the slippage between the film layers in the magazine increased directly therewith resulting in excessive abrasive damage to the film. Merely increasing the size of the magazine has not only been ineffectual in remedying this situation, but as a matter of fact has introduced other complicating factors which resulted in destruction of the synchronization between the unwinding, feeding and rewinding of the film. Moreover, the utilization of longer film lengths increasingly complicates the necessary compensation for changes in the actual length of the film occasioned by atmospheric variations and aging of the film.

It is, therefore, a primary object of this invention to provide a mechanism which will overcome all of the difficulties mentioned above.

Another object of this invention is to afford an apparatus which will enable a portable continuous loop projector to utilize a magazine containing a length of film approximately threefold that of the maximum length heretofore used, without increasing the inter-layer friction and its resultant abrasive damage to the film.

A further object is to provide a simple, yet effective, means for automatically compensating for changes in the length of the film occasioned by such variable factors as atmosphere and aging. An object relating thereto is to afford means which will automatically sense film length variations for the purpose of actuating secondary coil adjusting means. Yet another object relating thereto is to provide means for effectively separating film layers which tend to adhere excessively to each other.

Heretofore in projectors of the type described, the withdrawal of the film from the magazine has been predominately performed by driven sprocket wheels and the like; the sprocket teeth engaging the film perforations provided primarily for feeding the film through the projector itself. Such unduly frequent engagement of the perforations usually resulted in excessive wear at these points so that the useful life of the film was considerably shortened. Moreover, in those instances where other handling means were attempted, certain disadvantages were thereby introduced which made such means impractical.

It is, therefore, another important object of this invention to provide means for withdrawing film from a magazine which entirely eliminates the necessity for engaging the film perforations with sprocket teeth. An object relating thereto is to afford improved friction means for withdrawing the film from the magazine. A further related object is to provide slippage-free, friction withdrawing means which will nevertheless withdraw the film at rates of speeds perfectly synchronized with the speed that it is being fed through the projector.

Another undesirable objection which has heretofore been present in apparatus of this type is the danger of subjecting the film to excessive tension which might result in the tearing or weakening of the film. Obviously, increasing the length and weight of the film cartridge would ordinarily likewise increase the tension. Hence, this was yet another factor in limiting the length of films permissible for use with such projectors.

It is, therefore, still another important object to afford a mechanism which will permit the utilization of greatly increased film lengths not only without increasing the necessary tension to which the film must be subjected, but will in fact markedly reduce the tension upon the film. A related object is to so construct the film cartridge that the weight of the film therein will be distributed and evenly supported within the cartridge.

Yet another object is to afford means for utilizing the projector motor for driving the film in the magazine system. Yet a further related object is to provide sensitive clutch means for transmitting the motor power to the film driving means.

In devices of the type described which utilize continuous loop films of considerable length, the film is coiled in a multiplicity of layers within the magazine, so that the length of the inner periphery, from whence the film is withdrawn, differs materially from that of the outer periphery to which the projected film is returned. Consequently, since the film is withdrawn and returned at approximately the same speed, the rotational speeds of the peripheries must be different to compensate for this variation in their lengths. Furthermore, the rotational speeds of each layer between the peripheries theoretically vary accordingly. Hence, the successive layers of film in the magazine must slip one over the other. It is this slippage which abrades the film surfaces and has heretofore limited the number of layers as well as the length or size of the reel. Consequently the overall length of the film has likewise been limited.

It is, therefore, still another important object to provide a device which will overcome this objection. Specifically, this is accomplished by a combination of novel means incorporated in the present invention, but primarily it is effected by imparting a novel design to the shape of the magazine so that at certain segments of the reel, the film surfaces are substantially separated one from the other. Hence, by so constructing the device that slippage is localized at these segments, abrasion of the film surfaces is minimized. Conversely slippage is essentially eliminated within certain other segments of the reel.

Yet a further object is to afford a removable film cartridge which may be used interchangeably, thus obviating the necessity for unwinding and rewinding the film when it is desired to interchange the film with that of other machines.

Yet another object is to provide a mechanism of the character described in which the film is stored, unwound, rewound and moved through a tortuous path in planes which are essentially parallel to that of the path along which it moves through the projector. Consequently the danger of damage to the film and to the machine is minimized thereby.

And yet a further object is to provide a continuous loop film projection mechanism simply constructed of a minimum number of parts, yet effective, but nevertheless, comparatively inexpensive.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 2 is an enlarged sectional view taken on the plane of line 2—2 in Fig. 1, and viewed in the direction indicated;

Fig. 3 is a sectional view taken on the plane of line 3—3 in Fig. 1, and viewed in the direction indicated;

Fig. 4 is a somewhat enlarged sectional view taken on the plane of line 4—4 in Fig. 1, and also viewed in the direction indicated;

Fig. 5 is an enlarged fragmentary view of a detail shown in Fig. 1;

Fig. 6 is an elevational view similar to Fig. 1, but with a portion of the magazine broken away to show in greater detail the film feeding path of the apparatus;

Fig. 7 is a sectional view taken on the plane of line 7—7 in Fig. 6, and viewed in the direction indicated;

Fig. 8 is an enlarged foreshortened sectional view of the friction film unwinding wheel showing in detail the transmission and clutch; and Fig. 9 is a further enlarged, partially sectional, view showing a detail of construction of the clutch mechanism.

The projector

Figure 1:
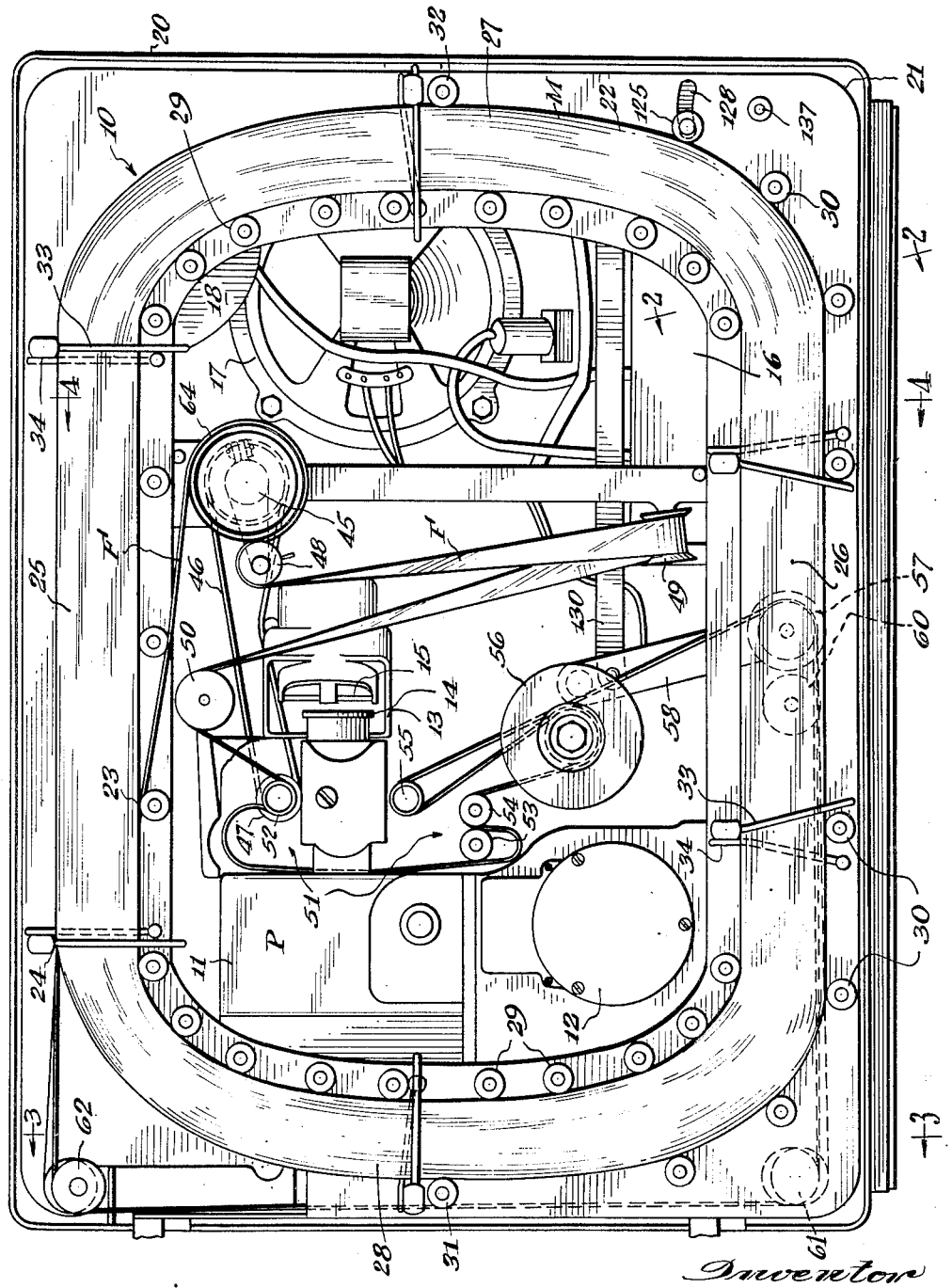
Fig. 1 is an elevational view of one side of the film projection apparatus showing the magazine and embodying the principles of the present invention.

Referring now to the drawings, Figs. 1 and 6 show the present invention indicated generally by reference numeral 10 operatively associated with a motion picture projector P. The projector P may be of any suitable type, and may have associated therewith suitable sound equipment. The projector illustrated in the drawings comprises a lamp housing 11 containing the usual lamp (not shown), a projector housing 12 containing a suitable projector motor (not shown), and an optical system 13 including a projection lens 14 and a reflector 15. Also shown in Figs. 1 and 6 is a sound system including an amplifier 16 electrically connected to a loud speaker 17, and suitably associated with the projector P. A cable drum 18 for storing a power-source-connecting cable 19 is also illustrated.

The housing and removable cartridge partition

All of the above described equipment may be compactly mounted within a portable housing 20 which may include a built-in screen (not shown). A removable partially open partition wall 21 separates the projection equipment from the film storage equipment, which will subsequently be described, and also serves as a base for said equipment including the continuous film magazine, which likewise will be subsequently described. Thus, when it is desired to replace the film in the projection unit, the partition 21 together with the film mounted thereon may be removed and replaced with a similar partition having a different film reel mounted thereon. Consequently, replacement of the film may be accomplished without winding and rewinding the entire film.

The film storage magazine

The film F is stored in a magazine M positioned in a vertical plane and containing a coil of film 22 comprising a multiplicity of layers of film. The film is withdrawn from the coil 22 from its innermost periphery as at 23, and after it has been fed through the projector P, in a manner to be subsequently described, it is returned to the coil at its outermost periphery as at 24, and rewound thereon.

It will be noted that the coil 22 is formed in a novel shape having substantially straight horizontal top and bottom sides 25 and 26 and curved, elliptically-shaped, but non-circular ends 27 and 28. This particular shape is of considerable importance, since it has been found by experiment and testing that only this shape is practical for storing and moving a large amount of film in a continuous loop magazine. If the shape is varied in any substantial manner, the inter-layer friction increases to the point that abrasive injury to the film surfaces makes it impractical to utilize such long film lengths. Although the end segments 27 and 28 of the coil have been described hereinabove as "curved, elliptically-shaped, but non-circular" in form, it should be understood that the degree of curvature of these end segments may vary depending upon the distance between the horizontal top and bottom sides 25 and 26. The applicant's experiments seem to indicate that the degree of curvature is determined by several factors including the stiffness of the film and the force of gravity exerted thereon. Hence, it is believed that the curvature in the end segments should approximate the shape which the film would naturally assume between two horizontal film segments, as determined by the stiffness of the film and the gravity exerted thereon.

The reason why this particularly shaped coil is conducive to the reduction of inter-layer friction is not fully known. However, tests have shown that little or no slippage occurs between the film layers within the horizontal sections 25 and 26. The inter-layer slippage has been found to occur almost entirely within the substantially vertical (elliptically curved) end segments 27 and 28. Hence, the theory explaining this phenomenon seems to indicate that this novel coil shape in combination with the novel film-withdrawing and feeding mechanism, which will be described hereafter, provides segments within which inter-layer slippage produces minimum friction or abrasion, and the slippage is localized within these segments. It is obvious that slippage within the horizontal segments 25 and 26 would produce considerable friction because the weight of the film coil at these points tends to bring the layers together in intimate contact. In contrast therewith the film layers in the end sections 27 and 28 are substantially separated one from the other, so that slippage at these points produces very little friction.

It should also be noted that this particular shape permits the utilization of a coil which may conveniently approximate and closely conform to the entire inner periphery of the housing 20. Thus, a much longer film may be utilized without substantially increasing the number of layers within the coil 22.

*The magazine supporting and retaining means*

The coil 22 is supported in the magazine M by a plurality of anti-friction rollers 29 affixed to the partition 21 and positioned within the coil, and by a plurality of similar rollers 30 positioned along the bottom portion of the outer periphery of the coil. It should be noted that the inner rollers 29 are positioned only along the bottom of the top and sides of the coil. Thus, the weight of the film is distributed evenly; the inner rollers 29 supporting the weight of the top section 25 and the outer rollers 30 supporting the bottom section 26. These rollers also cooperate with the inner rollers in supporting the end sections 27 and 28. The inner vertically positioned rollers function primarily as guide rollers, as do outer rollers 31 and 32.

To retain the film F on the magazine M, pivoted guide arms such as 33 are provided along the outer edges of the coil 22, and similar arms 34 are provided along the inner edges. In Fig. 2 of the drawings, these guide arms 33 are shown as comprising a hub 35 pivoted to the partition 21 by means of a pivot bolt 36, and with cylindrical smooth guide fingers such as 37 affixed to the hubs. The inner arms are similarly formed, but have somewhat smaller hubs such as 38 and may be immovably affixed to the wall 21, as shown at 39, since they need not be moved for inserting or removing film coils. Inner guide fingers such as 40 are connected to the hub 38 and primarily serve as separators between the coil 22 and the cartridge wall 21.

Each of the rollers 29 and 30 is in the form of a sleeve or spool 40 rotatably journaled on a pin 41 which is removably affixed to the wall 21 by a bolt 42.

As above described, it will be seen that the film coil 22 is supported entirely on rolling anti-friction surfaces, and it is retained in position and guided by smooth, frictionless guide fingers adjacent to its edges which substantially relieve all friction and monitor the coil during its operation.

*The withdrawing and feeding mechanism*

By reference to Figs. 1 and 6 of the drawings it will be observed that the innermost convolution of the film F is withdrawn from the coil 22 by means of a clutch, friction, take-off wheel 45 which may be driven by the projector motor 12. For this purpose the wheel 45 may be operationally connected by means of a drive-belt 46 to a motor-driven sprocket-shaft 47 in a manner which will be subsequently described. From the take-off wheel 45 the film may be directed to a speed and tension-responsive guide roller 48, the operation of which will be subsequently set forth in detail; thence downwardly and about a guide roller 49, up and over a second guide roller 50 and from the latter to the film advancing devices, indicated generally by reference numeral 51, of the projector P. These film advancing devices 51 may comprise an upper feed sprocket 52, powered by the projector motor and consequently mounted on the sprocket shaft 47, a pair of guide rollers 53 and 54 mounted below the projection optical system 13, and a lower feed sprocket 55 also positioned below the optical system, but above the guide rollers 53 and 54.

From the guide rollers 53 and 54 the film is fed through and about a sound-drum 56, and then up and over the lower sprocket 55 which is also powered for pulling the film through the sound-drum. The film is then passed down and about a roller 57 mounted on an arm 58 which may be pivoted as at 59. This structure is adapted to maintain the film leaving the projector in proper tension, and is also adapted to sense film length variations for the purpose of actuating coil-compensating means associated therewith in a manner which will be subsequently described.

From the roller 57 the film is guided by idler rollers 60, 61 and 62 through an opening 63 provided in the partition wall 21 and back to the outer periphery of the coil 25 in the magazine M.

It will be noted that the entire withdrawing and feeding mechanism including the various friction wheels, power-driven sprockets, idler and guide rollers and sensing mechanisms are designed, positioned and associated one with the other as well as with the film F in such a manner as to maintain perfect synchronization therebetween and with the previously described mechanisms for the purpose of imparting and maintaining the film in proper tension and speed throughout its storage and passage from the magazine, through the projector and return back to the coil.

As was previously mentioned, the take-off wheel 45 withdraws film from the coil 25 without the use of sprockets and the like. This is accomplished by providing a friction cover 64 for the peripheral surface of the wheel. This may comprise a layer of any suitable friction material such as rubber, leather, felt, cork, compositions and the like.

Since the friction wheel 45 is driven by the same motor which drives the projector film feeding mechanism 51, the rate of speed at which the film is withdrawn from the coil 25 is synchronized with the rate at which it is fed through the projector. However, any change either in speed or tension is immediately sensed and compensated for by the clutch wheel 45 and tension-responsive roller 48. For this reason the roller 48 is adapted to move vertically in respect to wheel 45 and in response to variations in the speed or tension of the film F as it passes thereover. This movement of the roller 48 actuates the clutch mechanism so as to increase or decrease the rotative speed of the wheel 45 and hence the speed at which the film is withdrawn from the magazine M.

*The transmission and clutch mechanism*

In Fig. 8 of the drawings is shown in detail the novel friction wheel 45 including the transmission and clutch mechanism which couples it to the projector power source. The drive-belt 46 engages at the wheel end a drive pulley 65 which may be formed with a central inwardly-facing boss 66 within which one end of a shaft 67 may be affixed as by means of a set-screw 68. The other end of the shaft 67 is directly connected as by means of a pin 69 to a central boss 70 of a front clutch plate 71 which is formed with a thickened outer portion 72 to afford an annular bearing surface 73, the function of which will become apparent as the description proceeds.

The annular friction cover 64 is supported on a wheel 74 which may be made of Bakelite and mounted by means of a central opening 75 on a sleeve 76 through which the shaft 67 extends. It is important to note that although the friction wheel 74 is supported by the shaft 67 it is not rotatably driven thereby. It is driven by means of the power transmitted thereto from the clutch plate 71 as the wheel 74 is brought in frictional bearing relationship with the bearing surface 73, and it is further driven by means which will now be described.

The above mentioned means comprises a rear clutch plate 77 having a bearing surface 78 and a rearwardly facing hollow boss 79. Within this boss 79 is fitted a bearing race 80 containing ball bearings 81, a sleeve 82 and an inner sleeve 83 similar to sleeve 76 and through which the shaft 67 extends.

Also mounted on shaft 67 to the rear of the above mentioned mechanism is a cam housing 84 having a boss 85 adjacent to and abutting the sleeve 82. The housing 84 is formed with a pair of cam-race openings such as 86 positioned one on either side of shaft 67. Within each of these openings is positioned a cam wheel such as 87 mounted on a horizontally disposed axle 88. The ends of the axles 88 are journaled within respective walls 89, 90, 91 and 92 which are formed integrally in the housing 84. A curved cam race such as 93, as shown in Fig. 9 of the drawings, is provided adjacent each of the cam wheels 87. The purpose of these curved cam races will become apparent as the description proceeds.

Attached to the housing 84 is a stirrup 95 having a spring-hinged member 96 at one end affixed to a mounting as by a screw 97 and having an arm 98 formed at the other end to which may be rotatably affixed the roller 48. A bent spring 99 affixed at one end to the arm 98 as at 100 urges the roller 48 towards the wheel 45.

In operation, when the tension on the film F within the film withdrawal system increases sufficiently to pull the roller 48 downwardly, the motion is imparted to the cam 87. The cam bears down on its curved race 93 and in following the contour thereof is thereby moved forward. This motion is then translated to the housing 84 and its boss 85 which, as it moves forward, bears against the sleeve 82. This pushes the sleeve and rear clutch plate 77 forward until its bearing surface 78 engages the rear face of the friction wheel 74 and moves it into more intimate contact with the front clutch plate 71. This wheel 74, being thereby frictionally engaged by both the front clutch plate 71 and the rear clutch wheel 77, increases in rotational speed as the faster shaft speed is better transmitted thereto. Consequently, the speed at which film F is removed from the coil 25 increases until the tension is reduced to the normal. Conversely as the film speed decreases the roller 48 is raised against the tension of spring 99 thereby releasing the clutch action of wheel 77 in the reverse of the manner described above.

Completing the description of the clutch mechanism as shown in Fig. 8 of the drawings, an enlarged sleeve 110 may be disposed about the shaft 67 between the drive pulley 65 and the above described clutch mechanism. The rear end of this sleeve 110 is journaled in a mounting bracket 111 which may be suspended from the projector housing 29. The shaft 67 is rotatably supported within the sleeve 110 by a rear bearing race 112 with ball bearings 113 therebetween; the race being retained in position by an annular shaft shoulder 114 afforded by offsetting the shaft at that point. The forward end of the sleeve is loosely fitted within an opening 115 formed in a front mounting bracket 116 which may also be suspended from the housing 29. This portion of the shaft 67 is supported by an inner sleeve 117 and an auxiliary mounting bracket 118 affixed to the bracket 116 as by rivets 119. This bracket 118 is flanged centrally to afford an outer sleeve 120 which cooperates with the inner sleeve 117 in supporting the shaft 67 within the sleeve 110; the forward face of this bracket containing the cam race 93.

From the above description it should be obvious that a novel transmission and clutch mechanism has been provided which not only permits the utilization of the projector power source for actuating the film take-off mechanism, but also synchronizes the film take-off movement with that of the projector feed; senses film speed and tension variations and compensates and adjusts therefor so as to maintain low tension and constant film speed; and permits the effective use of friction rather than sprocket take-off means.

*Film length variation compensating mechanism*

As was previously mentioned, the necessity for providing compensating means to offset length variations occasioned by changes in weather conditions and conditions of the film such as aging is especially emphasized in the present machine by reason of the greatly increased length of film utilized. Hence, a compensating roller 125 has been provided adjacent the outer periphery of the film coil 25 for changing the diameter and shape of the coil at this point; the roller being suitably associated with the film length variation sensing means previously described.

This roller 125 comprises a spool 126 rotatably journaled on a pin 127 which protrudes through an arcuate slot 128 formed in the partition 21; the pin and roller being free to move in a generally horizontal arcuate plane within the slot 128 in response to the actuation of the sensing means as transmitted through a novel linkage assembly which will now be described.

The sensing means comprises the roller 57 mounted on the pivoted arm 58. To this arm 58 is pivotally attached as at 129 one end of a horizontally disposed arm 130. The other end of this arm 130 is pivotally connected as at 131 to a generally vertically disposed arm 132 which is in turn affixed at its lower end to a motion-translating link 133. This link 133 is formed with an upwardly projecting leg 134 adapted to removably engage a roller-connecting link 135 as at 136. This link is pivotally affixed as at 137 to the wall 21 and has affixed to its upper portion as at 138 the roller pin 127. The link 133 is rotatably supported within a pair of bushings 139 and 140 journaled through the upper portions of a pair of upstanding bracket arms 141 and 142 which may be affixed to the bottom of the projector housing 20 by means of a pair of rivets 143 and 144 passed through the horizontal base 145 of the bracket.

In operation, tension variations in the film occasioned by changes in length of the film are sensed at rollers 57. Such variations cause the pivoted arm 58 to move within its plane either to the right or left as viewed in Fig. 6 of the drawings. This movement is translated to the roller 125 by means of the linkage 130, 132, 133, 134 and 135 causing the roller to move towards or away from the coil 25 as the case may be. This increases or decreases the diameter of the coil at this point and, when pressed inwardly, dents at least the outer layers of film at this point in the coil. Thus, changing the contour of the film also aids in separating any film layers which might tend to stick together. Conversely flaring of the film within the coil is sensed by the roller and translated through the above-mentioned linkage to the arm 58 so that it may move to compensate therefor by taking up the slack (increase the length of the film path between rollers 57 and 60). Thus, the proper tension is immediately again attained within the film system. Since film length variation compensation is not essential unless long film lengths are employed, the actuation of roller 125, although it is limited to substantially fully loaded magazines, is most effective from a practical standpoint.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a continuous loop film projection apparatus having a projector and a motor-driven film-feeding mechanism, a magazine containing a coil comprising a plurality of layers of film, projector-motor driven means for progressively withdrawing film from the inner periphery of said coil and means for rewinding said film on the outer periphery of said coil, said magazine having means for affording segments within said coil within which the film may move in substantially friction-free interlayer relationship, said projector-motor driven means comprising a projector-motor driven shaft, a friction-material covered take-off wheel loosely mounted on said shaft, clutch means for variably coupling said wheel to said shaft and a film-tension-responsive movable roller adapted to control said clutch means.

2. A film magazine for continuous loop projectors, comprising a base member disposed in a substantially vertical plane, a plurality of spaced rollers adapted to uniformly support a coil comprising a multiplicity of layers of film in a vertical plane on said base member and positioned to afford coil segments within which the film layers may move one over the other in substantially friction-free relationship, means for taking up film from the projector on one periphery, and variable speed means for withdrawing film from the other periphery of said coil; characterized by the positioning of said rollers to define a coil having substantially straight horizontal top and bottom segments and elliptically curved end segments, the film within said end segments being supported in layers of substantially friction-free interrelationship and the inter-layer slippage of the film within the coil being substantially confined to said end segments.

3. A film magazine for continuous loop projectors, comprising a base member disposed in a substantially vertical plane, a plurality of spaced rollers adapted to uniformly support a coil comprising a multiplicity of layers of film in a vertical plane on said base member and positioned to afford coil segments within which the film layers may move one over the other in substantially friction-free relationship, means for taking up film from the projector on one periphery, and variable speed means for withdrawing film from the other periphery of said coil; characterized by the positioning of said rollers to define a coil having substantially straight horizontal top and bottom segments and elliptically curved end segments, said rollers adapted to support said top segment and bottom segment independently of each other and further adapted to cooperatively support said end segments in substantially friction-free interlayer relationship.

4. A film magazine for continuous loop projectors, comprising a base member disposed in a substantially vertical plane, a plurality of spaced rollers adapted to uniformly support a coil comprising a multiplicity of layers of film in a vertical plane on said base member and positioned to afford coil segments within which the film layers may move one over the other in substantially friction-free relationship, means for taking up film from the projector on one periphery, and variable speed means for withdrawing film from the other periphery of said coil, characterized by the positioning of said rollers to define a coil having substantially straight horizontal top and bottom segments and elliptically curved end segments, a plurality of said rollers defining the inner periphery of said top segment and still others of said rollers defining the outer periphery of said bottom segment.

5. A film magazine for continuous loop projectors, comprising a base member disposed in a substantially vertical plane, a plurality of spaced rollers adapted to uniformly support a coil comprising a multiplicity of layers of film in a vertical plane on said base member and positioned to afford coil segments within which the film layers may move one over the other in substantially friction-free relationship, means for taking up film from the projector on one periphery, and variable speed means for withdrawing film from the other periphery of said coil; characterized by a housing containing said projector, said base member comprising a partition positioned with its peripheral edges adjacent the walls of said housing and said coil shaped to occupy substantially the entire marginal area of said base member.

6. A film magazine for continuous loop projectors, comprising a base member disposed in a substantially vertical plane, a plurality of spaced rollers adapted to uniformly support a coil comprising a multiplicity of layers of film in a vertical plane on said base member and positioned to afford substantially elliptical end coil segments within which the film layers may move one over the other in substantially friction-free relationship, means for taking up film from the projector on one periphery, variable speed means for withdrawing film from the other periphery of said coil, and a roller movable within an arcuate substantially horizontal slot positioned adjacent the outer periphery of said coil and adapted to respond to a film-length-variation sensing means to compensatingly alter the shape and size of said coil.

7. In combination with a continuous loop film projection apparatus having a projector, a motor-driven film-feeding mechanism including a sprocket mounted on a constant speed shaft, a magazine containing a coil comprising a multiplicity of layers of film, and means for taking up film from said projector and returning the same to the outer periphery of said coil; means for withdrawing film from the inner periphery of said coil comprising a friction-material covered take-off wheel loosely mounted on a power-driven shaft, transmission clutch means variably coupling said wheel to said shaft and film tension responsive means controlling said transmission clutch means for varying the rotational speed of said take-off wheel.

8. In combination with a continuous loop film projection apparatus having a projector, a motor-driven film-feeding mechanism including a sprocket mounted on a constant speed shaft, a magazine containing a coil comprising a multiplicity of layers of film, and means for taking up film from said projector and returning the same to the outer periphery of said coil; means for withdrawing film from the inner periphery of said coil comprising a friction-material covered take-off wheel loosely mounted on a power-driven shaft, transmission clutch means variably coupling said wheel to said shaft and film tension responsive means controlling said transmission clutch means for varying the rotational speed of said take-off wheel, said clutch means comprising a pair of plates mounted on said shaft adjacent said wheel and adapted to bear against the wheel in varying frictional relationship.

9. In combination with a continuous loop film projection apparatus having a projector, a motor-driven film-feeding mechanism including a sprocket mounted on a constant speed shaft, a magazine containing a coil comprising a multiplicity of layers of film, and means for taking up film from said projector and returning the same to the outer periphery of said coil; means for withdrawing film from the inner periphery of said coil comprising a friction-material covered take-off wheel loosely mounted on a power-driven shaft, transmission clutch means variably coupling said wheel to said shaft and film tension responsive means controlling said transmission clutch means for varying the rotational speed of said take-off wheel, said clutch means comprising a pair of plates mounted on said shaft adjacent said wheel, a cam housing also mounted on said shaft behind said clutch plates and containing a pair of cams, and a pair of curved cam races formed in a bracket and adapted to cooperate with said cams in moving the housing and clutch plates in varying frictional relationship with said wheel.

10. In combination with a continuous loop film projection apparatus having a projector, a motor-driven film-feeding mechanism including a sprocket mounted on a constant speed shaft, a magazine containing a coil comprising a multiplicity of layers of film, and means for taking up film from said projector and returning the same to the outer periphery of said coil; means for withdrawing film from the inner periphery of said coil comprising a friction-material covered take-off wheel loosely mounted on a power-driven shaft, transmission clutch means variably coupling said wheel to said shaft and film tension responsive means controlling said transmission clutch means for varying the rotational speed of said take-off wheel, said clutch means comprising a pair of plates mounted on said shaft adjacent said wheel, a cam housing also mounted on said shaft behind said clutch plates and containing a pair of cams, and a pair of curved cam races formed in a bracket and adapted to cooperate with said cams in moving the housing and clutch plates in varying frictional relationship with said wheel, and said tension responsive means comprising a movable film tension responsive roller adapted to move said cams over said curved cam races.

11. The continuous loop film projection apparatus of claim 7 characterized by pulley and drive belt means for coupling said power-driven shaft to said sprocket shaft.

12. In combination with a continuous loop film projection apparatus having a projector, a motor-driven film-feeding mechanism, a magazine containing a coil of film mounted in a vertical plane, means for taking up film from the projector and rewinding the same on the outer periphery of said coil, and variable speed means for withdrawing film from the inner periphery of said coil and adapted to maintain a minimum but constant tension on said film; an interchangeably replaceable magazine base member positioned to partition the projector from the coil, said magazine base member formed with a protected opening for passing therethrough film from the projector to the coil.

13. In a portable film projection apparatus of the character described utilizing a continuous coil disposed in a vertical plane and a projector simultaneously receiving film from the inner periphery of said coil and rewinding the same on to the outer periphery of the coil, means rotatably supporting said coil in substantially interlayer friction free relationship, a variable speed clutch controlled mechanism acting to maintain a relatively low and substantially constant tension on the film between the projector and the inner periphery of the coil, film-length-variation sensing means acting upon the film between the projector and the outer periphery of said coil, coil compensating means positioned adjacent said coil and means operatively connecting said sensing means and said compensating means.

14. In a continuous loop film projection apparatus having a projector and a motor-driven film-feeding mechanism, a magazine containing a coil comprising a plurality of layers of film, projector-motor driven means for progressively withdrawing film from the inner periphery of said coil and means for rewinding said film on the outer periphery of said coil, said magazine comprising a vertical base member, a plurality of anti-friction rollers affixed to said base member and positioned to support in substantially horizontal planes, the top and bottom segments of said coil in substantially immovable interlayer relationship and a plurality of similar rollers affixed to the base member and positioned to define and guide the end segments of the coil in elliptically-shaped, non-circular paths in which the coil film layers are substantially separated one from the other and free to slip one over the other in approximate abrasion-free relationship.

15. In a continuous loop film projection apparatus having a projector and a motor-driven film-feeding mechanism, a magazine, a coil comprising a plurality of layers of film, means for progressively withdrawing film from said coil and means for re-winding the film on said coil, said coil comprising a pair of substantially straight horizontal segments spaced one from the other and non-circular substantially elliptical curved end segments connecting said horizontal segments.

16. In a continuous loop film projection apparatus having a projector and a motor-driven film-feeding mechanism, a magazine, a coil comprising a plurality of layers of film, means for progressively withdrawing film from said coil and means for re-winding the film on said coil, said coil comprising a pair of substantially straight horizontal segments spaced one from the other and curved end segments, the curvature of said end segments approximating the shape the film would naturally assume as determined by the stiffness of the film and the exertion of gravity thereon.

ARTHUR J. BRADFORD.

References Cited in the file of this patent

UNITED STATES PATENTS

| Number | Name | Date |
|---|---|---|
| 1,288,531 | De Vry | Dec. 24, 1918 |
| 2,129,467 | Frederick | Sept. 6, 1938 |
| 2,238,719 | De Tartas | Apr. 15, 1941 |
| 2,279,022 | Dusker | Apr. 7, 1942 |
| 2,290,447 | Price | July 21, 1942 |
| 2,307,806 | Schnoor | Jan. 12, 1943 |
| 2,332,717 | Heyer | Oct. 26, 1943 |
| 2,341,313 | Chedister | Feb. 8, 1944 |
| 2,398,639 | Heyer | Apr. 16, 1946 |
| 2,499,119 | Smith et al. | Feb. 28, 1950 |

FOREIGN PATENTS

| Number | Country | Date |
|---|---|---|
| 401,947 | Great Britain | Nov. 23, 1933 |